Oct. 11, 1932.  J. S. HARDIMAN  1,881,533
MACHINE AND METHOD FOR ASSEMBLING ARTICLES
Filed Feb. 8, 1930  7 Sheets-Sheet 1

INVENTOR
James S. Hardiman
BY Norman N. Holland
his ATTORNEY Patented Oct. 11, 1932

1,881,533

UNITED STATES PATENT OFFICE

JAMES S. HARDIMAN, OF RIDGEWOOD, NEW YORK, ASSIGNOR TO ANCHOR CAP & CLOSURE CORPORATION, OF LONG ISLAND CITY, NEW YORK, A CORPORATION OF NEW YORK

MACHINE AND METHOD FOR ASSEMBLING ARTICLES

Application filed February 8, 1930. Serial No. 426,987.

The present invention relates generally to assembling machines and methods and more particularly to a method and machine for assembling the parts of closure caps or similar articles.

Without any intention of limiting the scope of the present application to the closure, to the machine, or to the minor details described, a particular application of the invention will be described in detail. It will be understood, however, that the invention may be applied in the manufacture of certain types of cans or other articles of a similar nature.

Due to the limitations in the drawings of metal, particularly coated sheet metal such as lacquered tin plate, it is not feasible to draw a cap of small diameter having a relatively long skirt, such as the caps now used for catsup bottles and the like. These caps are generally manufactured in two parts, the cylindrical body part being formed from a flat strip of metal with the ends interfolded to form a longitudinal seam along the side thereof. The top or button is secured to the body by an interfolded seam at one end thereof. The caps are well-known commercially and their details may be found in the patent to Robert A. Russell, No. 1,327,967, dated January 13, 1920. Both the button and body parts of such caps may have any desired decoration without danger of their being marred or spoiled during the manufacturing operations.

The seam on the side of the body part is objectionable from an artistic and commercial standpoint because of the size of the seam, consisting of four thicknesses of metal, and the relatively small dimensions of the article. It is, therefore, desirable to place this seam where it will not be seen. This is accomplished by applying a label to the side of the bottle opposite the seam of the cap or by starting the thread of the cap in definite relation to the seam so that the seam will be on the back of the bottle. The latter procedure has been found to be more practical and is used extensively.

The button on the cap lends itself particularly to decoration. It may be white with the remainder of the cap a different color, thereby making the button particularly conspicuous and the entire cap unusually attractive. In addition, a word or design is usually lithographed on the button. It is always desirable and certain packers insist upon such design or printing being positioned with respect to the seam of the cap and the label of the bottle so that one looking at the label of the bottle may also see the design on the button, or top of the cap, in its proper position without turning the bottle around. For example, if the words "Pure Food" were printed on the button without a definite relation to the label of the bottle or to the seam of the cap, it would be difficult to read this legend upside down; hence, the bottle would have to be turned around by the one observing it until the letters were right side up in order to read it properly. The turning of the bottle would expose the seam of the cap and would likewise turn the label away from the observer.

The advantage of having the seam of the cap on the back of the bottle and the printing on the button properly positioned with respect to the seam and the label, is sufficient to warrant the hand operation of adjusting the buttons as they are fed to the assembling machines. Millions of these caps are manufactured yearly with buttons positioned by hand in this manner. An operator, usually a girl, has to position the buttons for each of these caps; two girls are usually required for each machine. Even this has not been satisfactory because it is not possible to position them rapidly and accurately. The printing on the button often varies as much as ten to twenty degrees from its correct position.

The present invention aims to overcome these difficulties and to eliminate the labor required for positioning the buttons. Further, the invention aims to achieve these advantages by additions to the usual machines for making the caps with a minimum number of changes in the parts and operation of such machines.

An object of the invention is to minimize the labor and expense required in the manufacture of articles such as two-piece closure caps.

Another object of the invention is to provide a method and means for automatically and accurately positioning the button in proper registry with the body part of a closure cap.

Another object of the invention is to provide a method and machine for automatically positioning the button of a two-piece closure with the printing thereon in definite relation to the seam of the body part of a cap.

Another object of the invention is to locate a projection or indentation in a closure cap for positioning it with respect to the seam of the body part and thereafter concealing the projection in subsequent manufacturing operations.

Another object of the invention is to provide a positive button feed, thereby increasing the speed and reliability of the assembling machine.

Another object of the invention is to provide a method and means adapted to be applied to existing machines to position the buttons just prior to their entry into the machine, thereby minimizing the chance of their becoming disarranged.

Another object of the invention is to achieve the above and other objects by additions to existing machines with minimum changes in the parts and operation of such machines.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figures 1, 2, 3:
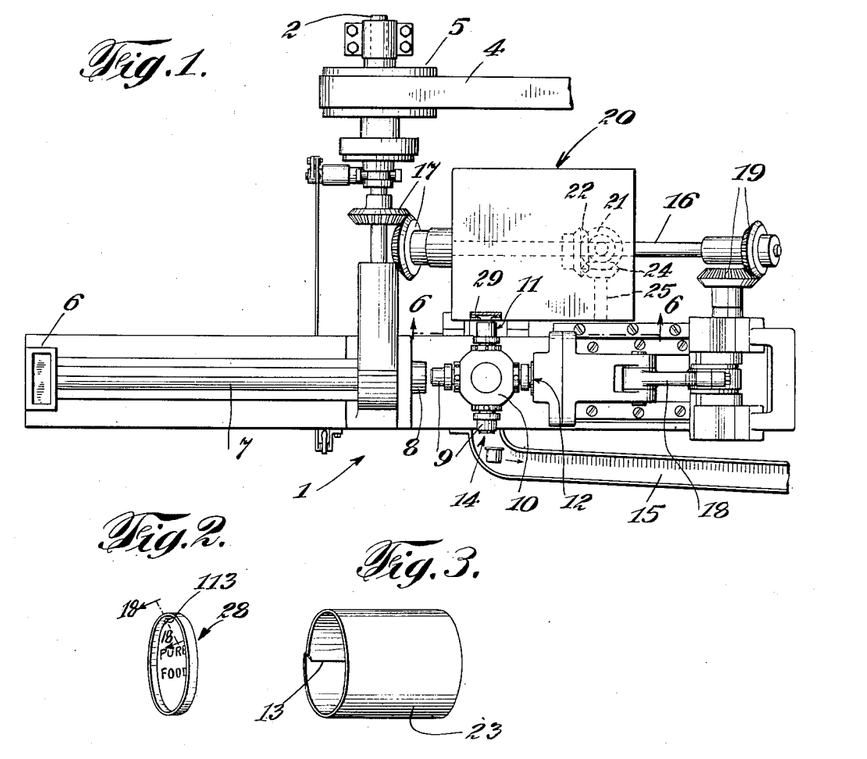
Fig. 1 is a diagrammatic plan view illustrating the operations of a machine adapted to form two-piece closure caps with a preferred embodiment of the invention applied thereto.
Fig. 2 is a perspective view of a button particularly adapted for the present invention.
Fig. 3 is a body part of a cap ready to be assembled with the button shown in Fig. 2.

A preferred embodiment of the invention and one way of practicing the method is illustrated in Fig. 1, in which the more important parts of a machine for assembling the buttons and body parts of two-piece closure caps are shown. The operations performed are illustrated in Figs. 2, 3, 4 and 5, where a cap is shown in its various states of manufacture.

The description herein of the machine shown in Fig. 1 is merely sufficient to give a general understanding of the operation thereof, its structure and operation being known. Several such machines are in operation in the plant of the assignee of this application, Anchor Cap & Closure Corporation, Long Island City, New York. The present invention is more particularly concerned with the insertion of the button within the body part and the turning of the button to make it register properly with the seam in the body.

Figure 4:
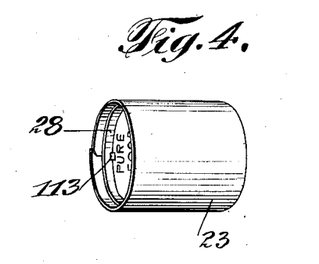
Fig. 4 illustrates the button assembled with the body part in proper relation to the seam of the cap.
Figure 5:
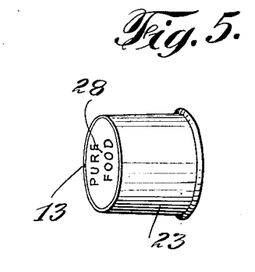
Fig. 5 illustrates the assembled button and cap with the edge of the body part turned inwardly to secure the button in position and to conceal the indentation in the button.
Figures 6, 10, 11:
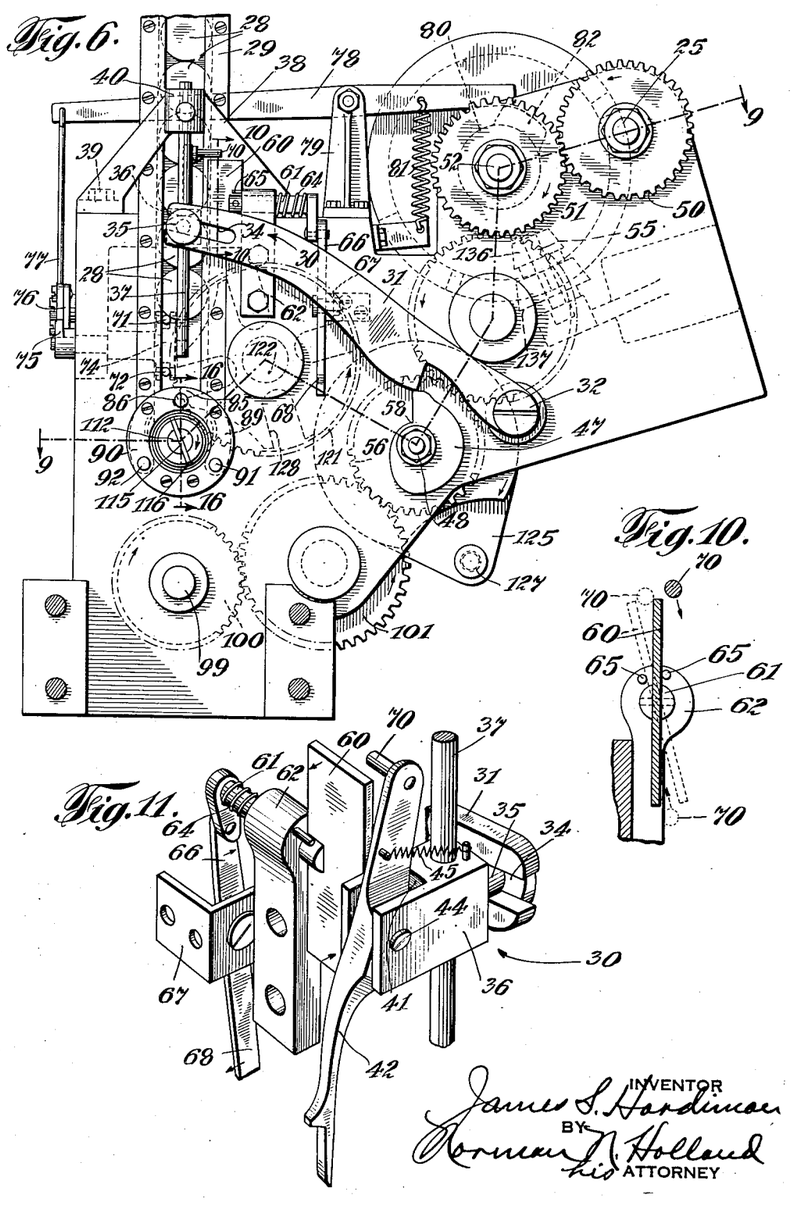
Fig. 6 is a front elevational view taken along the line 6—6 of Fig. 1, illustrating parts of the preferred embodiment of the invention.
Fig. 10 is a sectional view along the line 10—10 of Fig. 6.
Fig. 11 is a perspective view of the positive feed for the buttons.
Figures 7, 14:
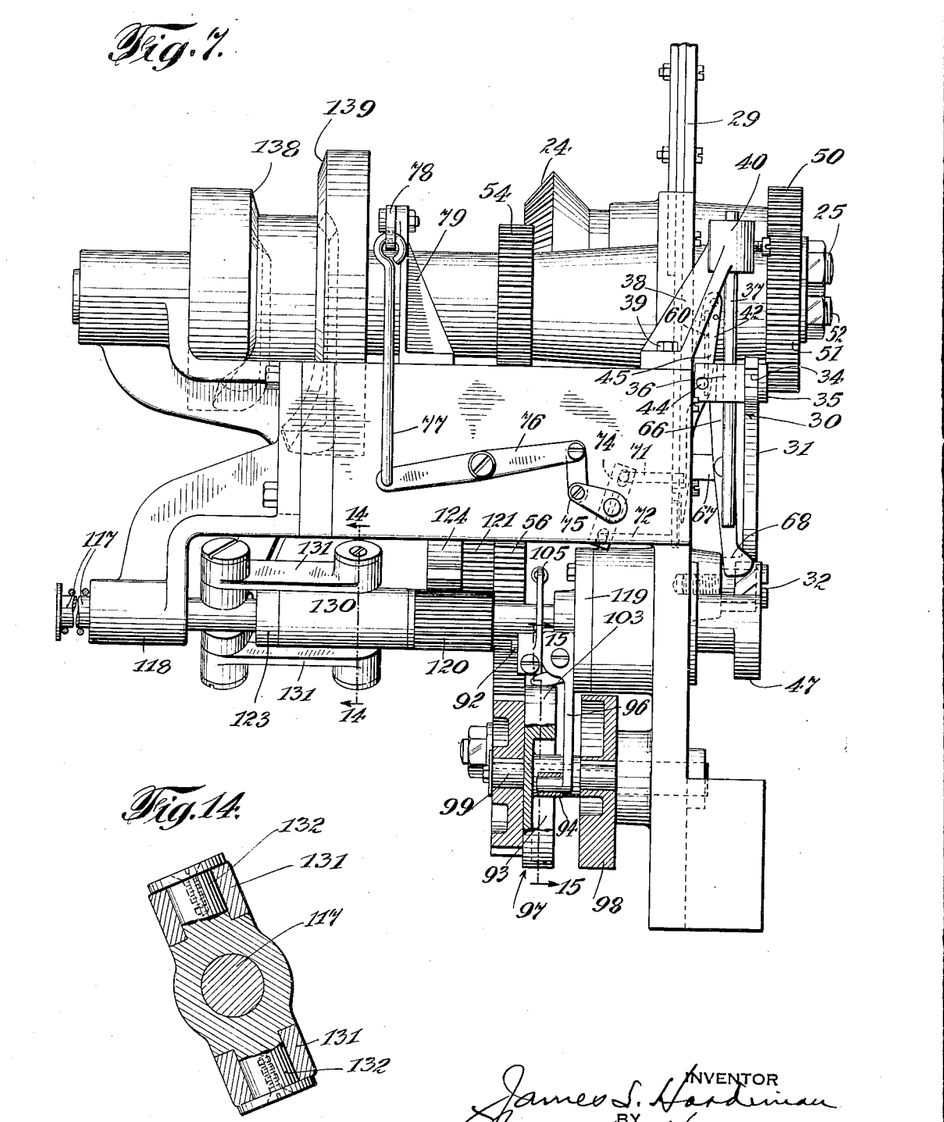
Fig. 7 is a side view of certain portions of the mechanism.
Fig. 14 is a detailed sectional view along the line 14—14 of Fig. 7.
Figure 8:
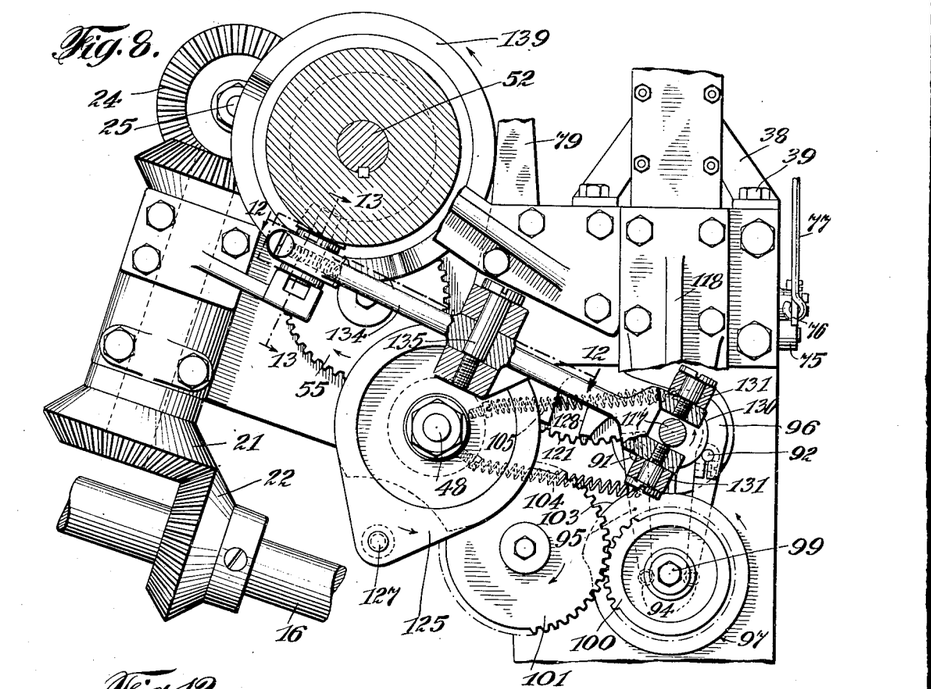
Fig. 8 is a detailed view, partly in section, of parts of the mechanism.

Referring more particularly to Fig. 1 of the drawings, a machine 1 is shown driven from a main drive shaft 2 by a belt 4 on a pulley 5. The machine comprises a magazine 6 having strips of metal adapted to be formed into a body part 23, (shown in Fig. 3) with the free ends of the strip interlocked by an interfolded seam 13. The forming of the body part is accomplished by the movement of the strips along the parts 7, which is commonly called a horn, and is finally delivered at station 8 to a cylindrical member 9 on the turret 10. The turret 10 rotates about its central part as an axis, the respective members 9 being advanced intermittently. At the station 8, the body part is placed upon the member 9. At the station 11, the button is placed in the body part, as shown in Fig. 4. At station 12, the outer edge of the body part is bent inwardly by a bumping mechanism 18 to form an interfolded seam with the button, as shown in Fig. 5, to hold the button in position and to conceal the indentation in the button. The bumping mechanism 18 is driven by a shaft 16 and bevel gears 17 and 19. At station 14, the finished caps are delivered to a chute 15 which may lead to a suitable rolling machine or other device for applying screw threads to the cap or other holding projections to facilitate application to a container.

The present invention is more particularly concerned with a mechanism, indicated at 20 in Fig. 1, which is associated with the button feed of such a machine, as described above, for facilitating the assembling of the button with the body part and for turning the button to make it register properly with respect to the seam of the body part so that any printing on the button has its top adjacent the seam in the body part to hide the seam of the body from the observer. For convenience in timing the operations with respect to the main machine, the mechanism 20 is operatively connected to the shaft 16 through bevel gears 21 and 22, the bevel gear 22 being, in turn, connected to bevel gear 24 on the drive shaft 25, which is connected to drive the mechanisms about to be described.

The more important operations of applicant's improvement are the button feed, the button positioning mechanism, the button turning mechanism, and the button and body assembling mechanism. The several elements co-operating to perform these various operations will now be described in the above order.

Figure 9:
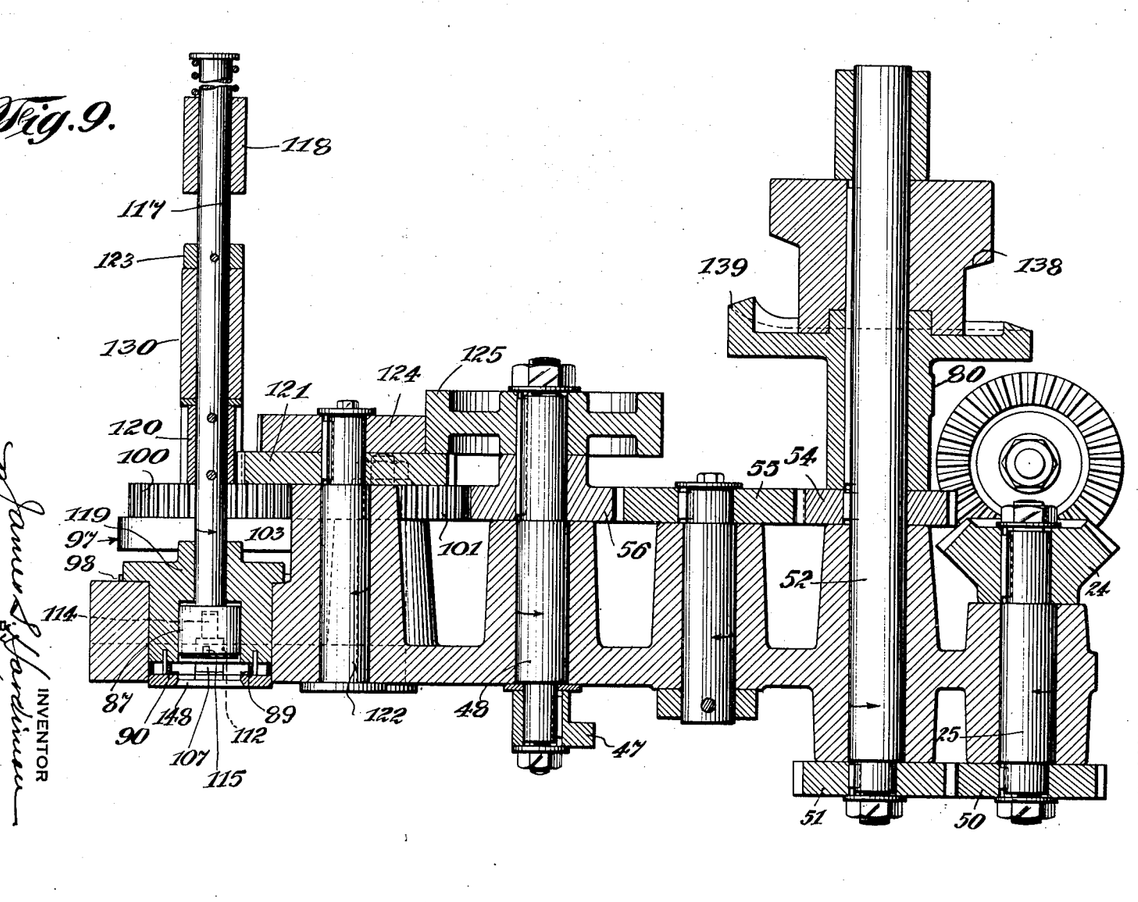
Fig. 9 is a sectional view along the line 9—9 of Fig. 6.
Figure 12:
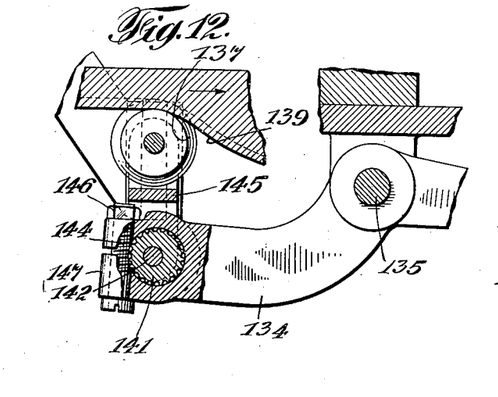
Fig. 12 is a detailed sectional view along the line 12—12 of Fig. 8.

The button feed is shown more particularly in Figs. 6, 7, 10 and 11. The small buttons 28 may be fed to a chute 29 from a suitable hopper, not shown herein, or by hand, so that the bottom of the button faces outwardly in Fig. 6 and the flange of the button faces inwardly. The buttons may be fed by gravity along the chute and preferably the chute is substantially perpendicular adjacent the delivery of the caps to the machine so that they will be fed by gravity. Due to the high speed of operation of the machines, gravity feed is not sufficient to assure the presentation of a button during the interval given for the presentation of the body part. In the event that a button is not presented, the body part goes around and is not delivered automatically at station 14 due to the fact that the ejector does not engage a button as no button is presented; hence, the ejector does not work and the machine has to be stopped to remove the body part therefrom. To avoid difficulties arising from a gravity feed, there is shown a mechanism 30 for positively feeding the buttons to the holding members. An operating member 31 is pivoted at 32 with its free end slotted at 34 to fit about a stud 35 on a member 36 slidably mounted on a vertical rod 37. The vertical rod may be mounted in any suitable manner, for example, by means of a bracket 38 secured to the framework of the machine by bolts 39 and having a bearing 40 at its upper part extending outwardly to support the rod in proper position. The member 36 has a recess 41 with an oscillating fork or member 42 pivoted therein by a pin 44. A suitable spring 45, attached to a projection on the member 42 and to a projection on the member 36, holds the lower end of the fork or member 42 against the buttons 28 in the chute 29. The pivoted member 31 is caused to oscillate by means of a cam 47 on shaft 48, which is driven from the main drive shaft 25 (see Fig. 9) by means of gear 50 on shaft 25 meshing with gear 51 on shaft 52 which, in turn, has a gear 54 thereon meshing with the idling stub gear 55 which is meshed with gear 56 on shaft 48. The shaft 48, through the intermediation of cam 47, raises and lowers the lever 31 once during each revolution thereof. A dwell 58 in the cam, co-operating with a similar dwell in the member 31, permits the member 31 to drop at a definite point during the rotation of the cam. This is to force the delivered button engaged by the member 42 quickly into its lower supporting position. It will be understood that the operation of the member 31 may be accelerated by means of a suitable spring, if desirable. Excellent results have been attained with the mechanism without the use of a spring because it prevents the button from being stopped in the guideway or chute.

In order to move the lower end of the member 42 away from the caps and from the chute 29 during its return upward movement, there is provided adjacent this member a substantially flat member 60 adapted to be mounted on a pin 61 in a bracket 62. A suitable spring 64 is provided at one end of the pin to provide sufficient friction to prevent accidental movement of the member. The pin 61 has an arm pivotally connected to a lever 66 which is, in turn, pivoted to a bracket 67 with the lower end 68 of the lever projecting outwardly into the path of the oscillating lever 21. In other words, when the lever 31 approaches its lower position, the lower end 68 of the lever 66 is engaged, which moves the upper end of this member in the direction indicated by the arrow in Fig. 11 which, in turn, oscillates the pin 61 and blade 60 in the directions indicated by the arrows. Such movement causes a pin 70 on member 42 to move upwardly on the inner side of the blade on its upward movement, that is, between the blade 60 and the guideway 29, thereby holding the lower end of the member 42 away from the guideway 29 during its upward movement. On its downward movement, the member 70 passes over the upper end of the blade 60 and comes down on the outside of the blade, independently of the blade; its position during the downward movement is controlled by spring 45 and the contact of the lower end of the member with the buttons. The oscillatory movement of the blade 60 is limited by the pins 65 in bracket 62. The path of movement of the pin 70, and likewise the oscillation of the blade 60, are shown in detail in Fig. 10.

The mechanism for releasing the buttons one at a time to be engaged by the positive feed just described, is illustrated more particularly in Figs. 6, 7 and 20 to 26 inclusive. A pair of pins 71 and 72 are connected to the ends of a pivoted member 74 which is oscillated by means of a link 75, pivoted lever 76, rod 77, and lever 78 pivoted on a bracket 79. The free end of the lever 78 (see Fig. 6) is held resiliently against the cam 80 by means of a spring 81. The cam 80 is mounted on shaft 52 and is adapted to release a cap in timed relation with the positive feed mechanism operatively connected with the same shaft. When the projection 82 on the cam 80 engages and raises one end of the lever 78, the other end of the lever forces downwardly the rod 77 and oscillates the lever 76, pushing the pin 71 inwardly to hold the buttons 28 in the portion of the guideway 29 above the pins. At the same time when the pin 71 is moved into the guideway, the pin 72 immediately below it is moved out of the guideway releasing a button which is held therebetween. As soon as the button is released, the projection 82 is moved by the rotation of the shaft 52 out of effective relation with the lever 78 and the right end of this lever is permitted to drop, which reverses the positions of the pins 71 and 72. In other words, the pin 72 is forced into the guideway and the pin 71 is removed therefrom. This permits the line of caps to drop onto pin 72. The distance that these two pins are separated is just sufficient to permit a single cap to be held therebetween. For each oscillation of the arm 74, upon which the pins 71 and 72 are mounted, a single button is delivered.

Preferably, the positive feed for the buttons along the chute releases a button just prior to the time it reaches its lowermost position. At this point, a spring 85, secured to the framework of the machine by screw 86, presses against the button and holds it in position substantially in a line with a mandrel 87 which is adapted to engage and rotate the button, which will be described hereinafter.

In order for the mandrel to perform its function properly, it is desirable that the button, which is about to be turned and placed within the body part of a cap, be positioned accurately with respect to the mandrel. The mechanism for this purpose is illustrated more particularly in Figs. 15 to 24 inclusive. There is provided a pair of shutters 89 and 90, pivoted to the framework of the machine by pins 91 and 92, which are operatively connected to levers 95 and 96 respectively, having cam rollers 94 engaging cams 97 and 98. These cams are mounted upon shaft 99, which is driven through gear 100 thereon. (see Fig. 6), idling gear 101, and gear 56 on shaft 48 which is, in turn, connected to the main drive shaft 25, as described hereinbefore and shown more particularly in Fig. 9. A suitable spring 104 for lever 95, and a spring 105 for lever 96 hold the cam rollers against the cam surfaces. The surfaces of the cams 97 and 98 are such that the two shutters 89 and 90 close about the buttons delivered by the positive feeding member 42 to pull the button downwardly and accurately position it with respect to the mandrel 87. It will be noted that the inner faces of the shutters 89 and 90 are cut away to fit about the buttons and to hold them against the pressure which may be applied by the mandrel 87.

A third member or shutter 107, cooperating with the shutters, is mounted beneath the button on a lever 108 pivoted to the framework of the machine by a pin 109 with its free end resting upon the outer surface of the cam 97. It will be noted that the cam 97 is a double cam; an inner recess or cam surface 93 serves to operate the shutter 90 and the outer surface 103 operates the lower supporting member or shutter 107. A spring 110, seated in the framework of the machine, is adapted to press the free end of the lever 108 against the cam 97 and, at the same time, to press the member 107 upwardly against the button. The cam 97 serves to lower the member 107 and to press it into an ineffective position. By having this member held against the button through the intermediation of a spring, it is possible to apply to the button a braking action, that is, a resistance to any turning movement. This prevents the button from being turned too far or inadvertently by the mandrel 87. The shutters 89, 90 and 107 serve the three-fold purpose of accurately positioning the button with respect to the mandrel, holding the button against movement toward the body part of the cap presented by the rotating turret 10, and furnishing a braking action to prevent the button from turning too easily.

For the purpose of turning the button to position the printing or other decoration thereon with respect to the seam of the body part, so that an observer will be on the side of the cap opposite to the seam when observing the printing in proper position to be read, the button is provided with an indentation or projection 113 at one point in its periphery at the junction of the flange of the button and the crown part thereof. This indentation is sufficiently small and positioned so closely to the periphery that it is completely concealed when the button is assembled with the body part and the edge of the body part turned over to grip and hold the button in position, as shown more particularly in Fig. 5. The mandrel 87 preferably has a removable head 112 to facilitate repair and replacement thereof with a stem 114 extending into the recess. In this way, the head 112 may be removed and replaced without the necessity of replacing the entire mandrel and disarranging the machine. The end of the head 112 on the mandrel is provided with a crown adapted to fit into the cupped portion of the button. A strip 115, extending across the crown, is sunk into the crown with the end projecting to form a projection 116 adapted to engage the projection 113 on the button.

Figure 19:
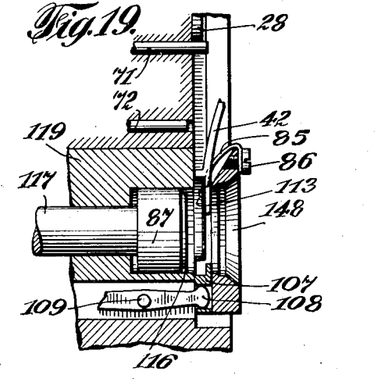
Fig. 19 is a sectional view illustrating the position of the parts as the button is released by the positive feeding element.
Figure 20:
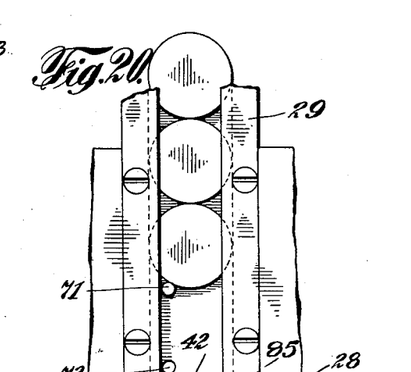
Fig. 20 is a sectional view illustrating the button engaging parts in Fig. 19.
Figure 21:
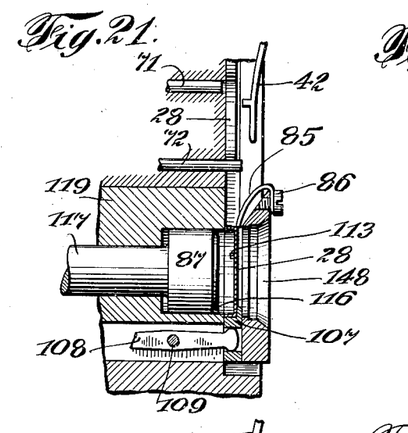
Fig. 21 is a sectional view illustrating the button with the shutters closed thereabout to hold it in position.
Figure 22:
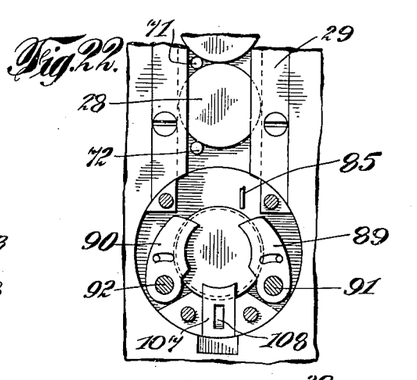
Fig. 22 is a sectional view illustrating the position of the shutters in Fig. 21.
Figure 23:
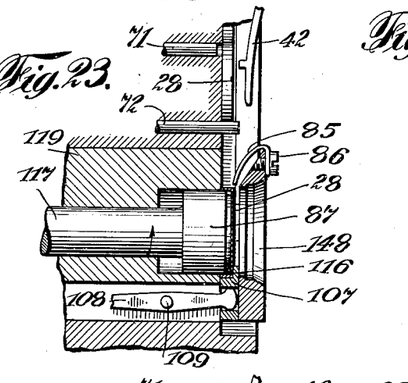
Fig. 23 is a sectional view illustrating the shaft advanced and being rotated to turn the cap to register properly with the seam of the body.
Figure 24:
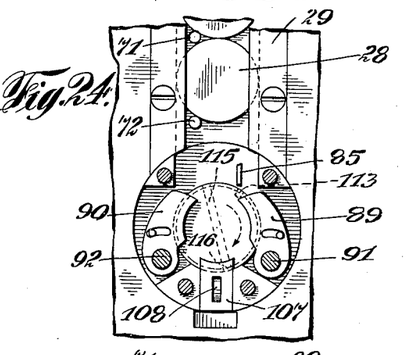
Fig. 24 is a sectional view illustrating the position of the shutters and other parts of Fig. 23.
Figure 25:
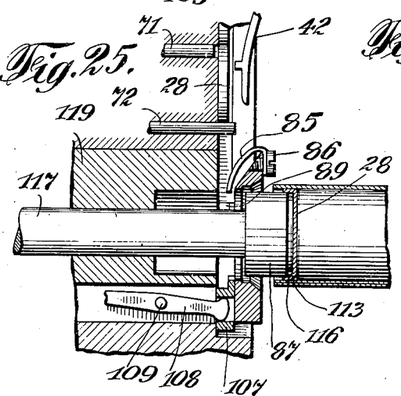
Fig. 25 is a sectional view illustrating the button being assembled with the body part of the cap.
Figure 26:
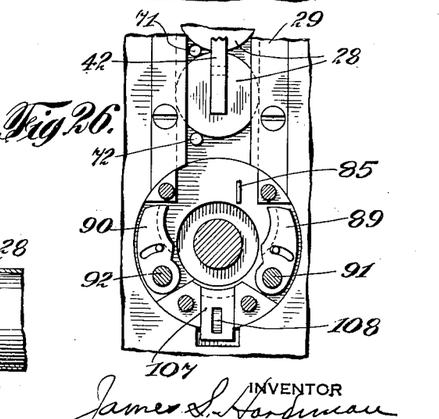
Fig. 26 is a sectional view at right angles to that of Fig. 25, illustrating the position of the parts of the mechanism shown therein.

Referring more particularly to Figs. 16 to 26 inclusive, it will be noted that the button has been delivered in Figs. 19 and 20. In Figs. 21 and 22, the shutters 89, 90 and 107 have closed about the button to position it properly with respect to the mandrel 87. In Figs. 23 and 24, the mandrel is shown after it is moved forward into engagement with the button and is in the operation of turning the button into proper registry with the body part of the cap.

The mechanism for achieving this operation is shown more particularly in Figs. 6, 7, 8, 9, 23 and 24. The mandrel 87 has an outwardly extending shaft 117 mounted in a bearing 118, the shaft being slidable longitudinally in this bearing and likewise in the bearing 119 adjacent the head of the mandrel. An elongated gear 120 is keyed to the mandrel and meshes with a gear 121 on stub shaft 112. Mounted also upon the shaft 122 is the driven member 124 of a Geneva movement, which meshes with the driving member 125 of the same, mounted upon shaft 48. The driving member 125 of the Geneva movement has a projection 127 thereon, more clearly shown in Fig. 6, adapted to engage dwells 128 in the driven member and rotate the driven member one quarter of a revolution for each revolution of the driving member 125 and shaft 48. The operation of Geneva movements is well known in the art and a detailed description is, therefore, unnecessary. The gears 120 and 121 are so related that the mandrel 87 is rotated a complete revolution for each operation of the Geneva movement. In this way, the button is rotated an amount depending upon the position of the projection 113 in the button while the mandrel is in engagement therewith. The button does not start rotating until the projection 113 engages the corresponding projection 116 on the mandrel. The gear 120 is sufficiently long so that the mandrel may be moved inwardly a substantial distance without disturbing its mesh with the gear 121.

In order to give the proper longitudinal movement for the shaft 117 to insert the button in the body part, there is provided a sleeve 130 (see Figs. 7, 8, 9 and 12) held in position by the gear 120 and collar 123, although permitted to rotate on the shaft. A pair of links 131 are secured to the collar by means of projections 132. These links are likewise secured at their other ends to a lever 134 pivoted to the framework by means of a bolt 135. The other end of the lever is provided with a pair of cam rollers 136 and 137 adapted to engage respectively the cam surfaces 138 and 139, which are parts of cams mounted upon shaft 52. The purpose of having two cams and two cam rollers on the end of this lever 134 is to accurately control its position in two directions, that is, to accurately position the mandrel 87, operatively connected thereto.

Figure 13:
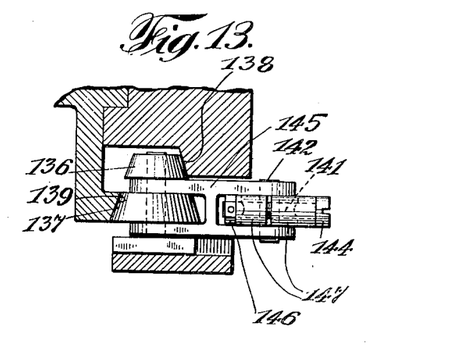
Fig. 13 is a detailed sectional view along the line 13—13 of Fig. 8.
Figure 15:
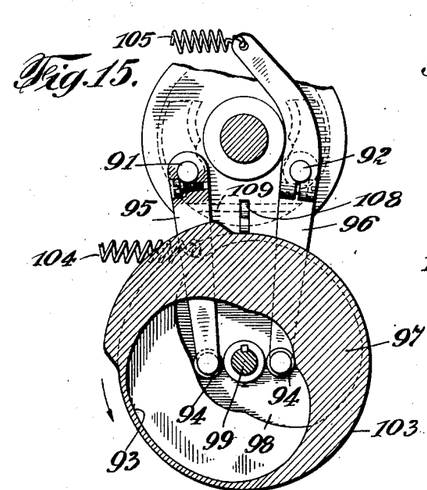
Fig. 15 is a detailed sectional view along the line 15—15 of Fig. 7.
Figure 16:
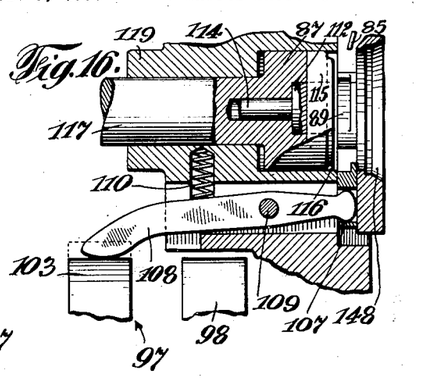
Fig. 16 is a sectional view along the line 16—16 of Fig. 6, illustrating the button holder.
Figure 17:
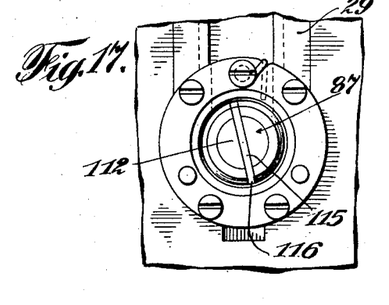
Fig. 17 is a detailed view illustrating an end view of the mechanism shown in Fig. 16.
Figure 18:
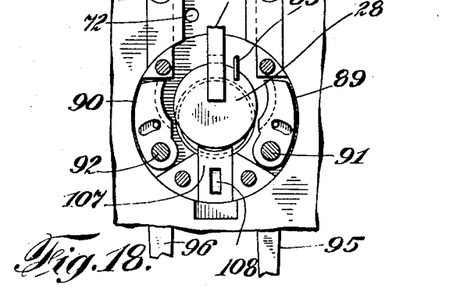
Fig. 18 is a detailed sectional view illustrating the indentation in the button of the cap.

For the purpose of adjusting more accurately the distance that the mandrel moves inwardly against the button, because too great a movement would result in breakage of the shutters, there is provided a fine adjustment on the end of the lever 134. This adjustment is more particularly shown in Figs. 12 and 13, wherein a circular aperture is provided in the end of the lever 134 and a disc member 141 fitted therein with a pin 142 eccentrically mounted with respect to the disc. The disc member has a series of teeth about its periphery which form a worm gear with a screw or bolt 144. By rotating the bolt, the disc 141 is moved about the eccentric pin and the distance or length of the end of the lever 134 may be changed slightly and accurately, as well as the effective length of the members 145 connecting the end of the lever with the cam rollers 136 and 137. After the adjustment has been made, a nut 146 on the end of the bolt may be tightened, which secures together the bifurcated end of the lever 134 to prevent further movement of the disc and to hold the parts rigidly in position. A suitable collar 147, formed in two parts, may be provided about the bolt, as indicated more particularly in Fig. 12. The cam surfaces 138 and 139 are suitably curved so that the mandrel 87 is first moved inwardly about three sixteenths of an inch to firmly engage the button while held in position by the shutters. At this time, the Geneva movement rotates the shaft, through gears 120 and 121, a complete revolution during a part of which the projection 116 on the mandrel is in engagement with the projections 113 on the button of the cap to rotate the button. It will be noted that, after rotation, the projection 116 on the mandrel is always in the same position and the projection on the button will likewise be in the same position abutting the projection 116. Since, by nature of the machine, the body part of the cap is always presented at station 11 and the other stations, for that matter, with the seam in exactly the same position, which is generally on the bottom, this rotation of the mandrel while in engagement with the button turns the button to its proper position.

Immediately after the turning operation, the cams 97 and 98 (Fig. 15) operate to open the shutters 89 and 90 and the brake member 107 to free the button supported on the end of the mandrel. The annexted parts back of the button or intermediate the button and the body part of the cap are recessed, as shown at 148, to permit outward movement of the button. As soon as the shutters have cleared the button, leaving it on the mandrel 87, the cam surfaces 138 and 139 on shaft 52 operate, through lever 134 and shaft 117, to force the mandrel outwardly through the recess 148 and to force the button into the body part of the cap, which is held in position at station 11 on one of the members 9. It will be understood that all of these movements are timed with respect to the movement of the turret 10 which delivers the body parts of the caps. The button is forced into the body part, as shown more clearly in Fig. 4, with the projection 113 on the button in registry with, or in a definite position with respect to, the seam of the cap. Thereafter, the turret 10 rotates both the button and the cap, assembled, around to station 12 where the bumping mechanism bends inwardly the edge of the body part to conceal the projection 113 on the button and to rigidly secure the button to the body part. At station 14, a suitable ejector forces the assembled cap into the chute where it may be delivered to any other machines for further operations.

In the operation of the machine, suitable strips of metal are placed into the magazine 6. These strips of metal are bent about the horn enclosed in the part 7, formed into a cylindrical body such as shown in Fig. 3 and delivered to one of the members 9 on the turret 10 ready for assembly with a suitable button. The turret, upon its next movement, places the button at the station 11 with the seam downward ready to receive a button.

The buttons are delivered to a chute 29 by means of any suitable hopper, not shown herein. As the buttons proceed along the chute, all facing in one direction, they are stopped by means of the pins 71 and 72 extending into the chute. The pins 71 and 72 are connected to a suitable yoke 74 which is operated through a link 75, lever 76, rod 77, lever 78, and cam 80 to oscillate the yoke 74. The oscillations of this yoke remove one of the pins from the guideway simultaneously with the insertion of the other. In this way, the upper pin is inserted into the guideway to stop the line of caps as the lower pin 72 is removed to drop a single cap. When the lower pin is returned, the upper pin 71 is moved out of the guideway which permits a single cap to drop between the two pins 71 and 72. In this manner, the buttons are delivered or released one at a time. Each released button is engaged by the lower end of the fork or member 42 (Figs. 6 and 11) which reciprocates upwardly and downwardly. During the downward movement, the lower end of the member is held in engagement with the cap by means of a spring 45, and during the upward movement it is held out of engagement with the cap and with the guideway by means of the projection 70 riding upon the inner side of the blade 60, the blade 60 being oscillated at proper intervals by means of the lever 67 so that the pin 70 on the member 42 passes around the blade 60 in all cases. This movement is illustrated in detail in Fig. 10. A fork or member 42 increases the downward speed of the buttons and avoids defective operation by reason of the caps not reaching their destination in ample time for subsequent operations. After the cap has been delivered, it is held in position by means of the spring 85 until the shutters 89 and 90 close about the cap and pull it down into alignment with the mandrel 87. The shutters 89 and 90 are operated by means of levers on the pins 91 and 92, operatively connected to cam 97 and 98 (see Fig. 15). The braking member 107, at the bottom of the button, is likewise raised by means of the cam surface 103 of the cam 97, effective upon the lever 108 through the intermediation of spring 110 to apply a braking action to the rotation of the cap and to hold it resiliently in position. The shutters and the member 107 have suitable flanges extending back of the button so that it does not move outwardly under the pressure of the mandrel during the turning operation. After the button is properly positioned, the mandrel 87 is moved forward by means of the lever 134 pivoted at 135 and actuated by means of the cams 138 and 139 effective upon the cam rollers 136 and 137 adjustably connected to the free end of the lever 134. The mandrel 87 is moved inwardly a short distance, which may be about three sixteenths of an inch, until its crown presses firmly against the crown of the buttons and, in this position, the mandrel is rotated by means of gear 120 meshing with gear 121 which, in turn, is rotated by means of the Geneva drives 124 and 125 to give the shaft 117 and mandrel 87 a complete revolution, which rotates the button beginning when the projection 116 on the mandrel engages the projection 113 on the button. The button is turned around until the projection is in a definite position in all instances; as here shown, on the bottom. After the button has been rotated to register with the body part of a cap, the cams 97 and 98 operate to open the shutters and also to lower the braking member 107 so that the button rests upon the end of the mandrel and is free to move longitudinally of the axis of the mandrel into the body part of a cap which is aligned with the mandrel. The cams 138 and 139 thereupon move the shaft 117 and mandrel 87 longitudinally to insert the button within the body part of a cap and, thereafter, to return the mandrel to its original position. The assembled body part and button are rotated by means of the turret 10 until they align with the bumping mechanism 18, which turns inwardly the edge of the body part, making it conceal the projection 113 at the junction of the flange and cover part of the button, and also securing the button rigidly within the body part. Thereafter, the turret moves the cap to the next station and ejects it in the chute. Each button and cap follows through the same cycle of operation, the various operations being performed substantially simultaneously at the four stations about the turret.

It will be seen that the present invention provides an improved machine and method for assembling the parts of two-piece closure caps. The button is made to register properly with the seam of the body part so that the seam is normally concealed from one reading the legend on the button. The labor heretofore required for turning the button is completely eliminated. The projection formed in the button to facilitate the turning operation is concealed in subsequent operations. A much neater article results without additional cost in manufacture. Further, the device may be applied to existing machines without substantial changes therein. It is, therefore, unnecessary to scrap or discard existing machinery to practice the invention. The device is rugged in construction, simple in operation, and composed of a minimum number of parts fully capable of withstanding the rough usage to which they may be subjected.

As various changes may be made in the form, construction and arrangement of the parts, as well as in the articles operated upon, without departing from the spirit of the invention, the description of the preferred embodiment herein is to be interpreted as illustrative and not in a limiting sense.

Having thus described my invention, I claim:

1. The method of assembling the parts of a closure cap, which method comprises positioning the body portion of the cap, aligning the button or end of the cap with the body portion, rotating the button while thus aligned to bring it into a definite position with respect to the body portion, and assembling the button and body portion.

2. The method of assembling the parts of a closure cap having a seamed body portion and a decorated top or button, which method comprises aligning the button of the cap with the body portion, rotating the button while thus aligned to make the decorations thereon register properly with the seam of the cap, and assembling the body portion and button.

3. The method of arranging a button, with decorations thereon, in proper relation to the seam of the body part of a cap, which method comprises aligning the button with respect to the body part of the cap, rotating the button while thus aligned and inserting the button within the body part of the cap.

4. The method of assembling decorated buttons with seamed body parts of closure caps, which method comprises feeding the buttons along a guideway into alignment with the seamed body parts, rotating the aligned buttons until the decoration thereon is properly positioned with respect to the seam, and inserting the buttons within the seamed body parts.

5. The method of assembling a button having printing thereon with a seamed body, which method comprises substantially aligning the button with the body part, rotating the button until the top of the printing substantially coincides with the seam of the body part so that one reading the printing on the button will not see the side of the body having the seam thereon, and assembling the parts in this position.

6. The method of assembling a button with the body part of a cap, which method comprises forming an irregularity on one of said members, and utilizing said irregularity for rotating said member into proper registry with the other of said members.

7. The method of assembling a button with the body part of a closure cap, which method comprises aligning said members, rotating one of said members while thus aligned into proper registry with the other of said members, and assembling said members.

8. The method of assembling a button with the body part of a closure cap, which method comprises forming a projection on the button of the cap, utilizing said projection for positioning the button in proper registry with the body part of the cap, and assembling said button and body part.

9. The method of assembling a decorated button with a seamed body part of a cap, which method comprises forming a projection on the button of the cap, aligning the button with the body part of the cap, utilizing said projection for positioning said button in proper registry with the body part of the cap, and assembling said cap and body part.

10. The method of assembling the body part and button of a closure cap, which method comprises feeding a button automatically into alignment with the body portion of a cap, holding the button in alignment with said body part but spaced from it, rotating the button aligned into proper registry with the body part, and inserting the button within the body part of the cap.

11. The method of assembling a decorated button with the seamed body portion of a cap, which method comprises forming a projection on the button, feeding the button into substantial alignment with the body portion of a cap, holding the button in such position, engaging said projection on the button and rotating the button until said projection has a definite position with respect to the seam of the body part of the cap, and assembling said button and said body part.

12. The method of positioning buttons in the seamed body portions of closure caps, which method comprises forming a projection on the button and utilizing said projection for positioning the button with respect to the seam of the body part of the cap.

13. The method of assembling decorated buttons with body parts of closure caps, which method comprises forming a projection on the button, holding the button in a definite position to permit it to be rotated, and utilizing said projection to rotate the cap until said projection is in a definite position with respect to the body part of the cap, and thereafter assembling the body part and button.

14. The method of turning a button to position same with respect to the body portion of a cap which method comprises forming a projection on the button and engaging the projection to rotate the button into proper registry with the body part of a closure cap.

15. The method of positioning buttons in the seamed portions of closure caps, which method comprises forming a projection on the button, utilizing said projection for positioning the buttons with respect to the seam of the body part of a cap, and concealing said projection by means of the metal turned inwardly to secure the buttons and body part together.

16. In a device of the class described, the combination of means for holding a button and means for engaging said button and rotating it to position said button with respect to the seam of the body portion of a closure cap.

17. In a device of the class described, the combination of means for supporting a button, means for engaging and rotating said button, and means for resiliently opposing the rotation of said button to prevent accidental rotation thereof.

18. In a device of the class described, the combination of shutters closing about a button, and means for rotating said button and thereafter forcing it into the body part of a closure cap.

19. In a device of the class described, the combination of shutters adapted to close about a button about to be assembled with a body part, means adapted to engage said button and provide a braking action opposing rotation thereof, and means for engaging and rotating said button.

20. In a device of the class described, the combination of means adapted to support the button member of a closure cap, means for supporting the body member of a closure cap, and means for rotating one of said members to make it register properly with the other of said members.

21. In a device of the class described, the combination of means for supporting a button for a closure cap, means for supporting the seamed body part of a closure cap, and devices for rotating said button to position said button and the printing thereon with respect to the seam of the said body part.

22. In a device of the class described, the combination of means for supporting a button for a closure cap, said button having a projection thereon adjacent the periphery thereof, means for engaging said projection and rotating said button to make the projection assume a predetermined position with respect to the seamed body part of a closure cap, and devices for assembling said button and body part.

23. In a device of the class described, the combination of means for delivering a button at intervals, means for closing about said button to hold it in a definite position, and means for engaging and turning said button and thereafter forcing it into the body part of a closure cap.

24. In a device of the class described, the combination of means for feeding a button, means for supporting said button, means for supporting the seamed body part of a closure cap with the seam in a definite position, means for engaging said button and rotating it to position the printing with respect to the seam of the body part, said means being adapted to force said button into said body part.

25. In a device of the class described, the combination of supporting means for a button having a projection thereon, a mandrel adapted to engage said button, means for rotating said mandrel a revolution, and means on said mandrel for engaging a projection on the button to rotate the button an amount depending upon the position of said projection.

26. In a device of the class described, the combination of means for supporting a button for a closure cap having an irregularity therein, a mandrel for engaging said button, a Geneva movement for rotating said mandrel a complete revolution, and means on said mandrel adapted to engage the irregularity on said button to position said button on said supporting means.

27. In a device of the class described, the combination of means for supporting a button, a mandrel adapted to move forward to engage and rotate said button, and an eccentric connection for determining the distance that the mandrel moves into said button.

28. In a device of the class described, the combination of means for supporting the body part of a closure cap having a seam therein, means for supporting the button therefor in alignment with the body part, means for rotating said button while in alignment with said body part, and devices for forcing said button into said closure cap.

29. In a device of the class described, the combination of means for supporting the seamed body part of a closure cap, means for supporting the button therefor in alignment therewith, said button having a projection thereon, a mandrel having a co-operating means adapted to engage said button, means for rotating said mandrel to bring the means thereon into engagement with the projection on the button to rotate the button, and means for forcing said mandrel toward said body part to assemble the body part and said button.

30. In a device of the class described, the combination of means for supporting the seamed body part of a closure cap, means for supporting a button substantially in alignment therewith, a mandrel substantially in alignment with said button and said body part, means for bringing said mandrel into engagement with said button and for rotating same, said means being adapted to force said mandrel further toward the body part when said turning operation is completed to assemble the body part and the button.

31. In a device of the class described, the combination of a chute for feeding closure caps, a member for forcing the buttons along said chute, means for reciprocating said member in a vertical direction, resilient means for holding said member against said buttons, and means for moving said member in opposition to said resilient means when said button has reached its destination.

32. In a device of the class described, the combination of a pivoted member, the lower end of said member being adapted to engage and move buttons downwardly along a chute, resilient means for holding said lower end of the member in operative relation to said buttons, and means for engaging said member and moving it away from said buttons during the return movement of said member.

33. In a device of the class described, the combination of a pivoted member adapted to engage at one end buttons in a chute to move them therealong, a projection on said member, and another member adapted to be oscillated so that said projection moves downwardly on one side of said plate and upwardly on the other side thereof to control the movement of said member.

34. In a device of the class described, the combination of means for supporting a button for a closure cap, said button having a projection thereon, means for engaging said button, means for rotating said button to make the projection assume its proper position with respect to the seamed skirt of a closure cap, means for assembling said button and skirt portion, and means for discharging the assembled cap from said devices.

35. The method of assembling a decorated button with the seamed body portion of a closure cap, which method comprises forming a projection on the button, feeding the button into substantial alignment with the body portion of a cap, holding the button in such position and rotating the button until said projection has a definite position with respect to the body part of a cap, and assembling said button and said body part.

36. In a device of the class described, the combination of devices for holding a button, said button having means thereon to govern the position of the button, mechanism for engaging said button and rotating the button an amount depending upon the position of said means on said button with respect to the body part.

37. In a device of the class described, the combination of means adapted to support a button member of a closure cap, means for supporting the body member of a closure cap, means for rotating one of said members to make it register properly with the other of said members, and devices for assembling said button member and said body member.

38. In a device of the class described, the combination of devices for holding a button for assembly with a seamed body part, said button having a projection thereon to govern the position of the button, means for supporting the seamed body part, mechanism for engaging said button and rotating the button an amount depending upon the position of said projection on said button with respect to the seam of the body part.

JAMES S. HARDIMAN.